United States Patent [19]
White

[11] 3,898,839
[45] Aug. 12, 1975

[54] ULTRASONIC TESTING SYSTEM FOR A TEST PIECE

[75] Inventor: Allwyn M. White, Danbury, Conn.

[73] Assignee: Automation Industries, Inc., Los Angeles, Calif.

[22] Filed: Nov. 8, 1973

[21] Appl. No.: 413,939

[52] U.S. Cl................................................ 73/67.8 R
[51] Int. Cl.².......................................... G01N 29/00
[58] Field of Search................ 73/67.8 R, 67.7, 67.6, 73/67.5 R, 67.9

[56] References Cited
UNITED STATES PATENTS

| | | | |
|---|---|---|---|
| 2,751,783 | 6/1956 | Erdman | 73/67.8 R |
| 2,830,201 | 4/1958 | Wilson | 73/67.5 R X |
| 3,768,306 | 10/1973 | Stearns | 73/67.8 R |

*Primary Examiner*—Jerry W. Myracle
*Attorney, Agent, or Firm*—Dan R. Sadler

[57] ABSTRACT

An ultrasonic testing system for testing a test piece for flaws or the like wherein the piece is mounted in a manner exposing both ends thereof. Nozzles are arranged at each end of the test piece and jets of water or other liquid couplant are directed from the nozzle toward the test piece ends. Ultrasonic transducers are mounted within cavities provided in the nozzles and thus a solid body of couplant is created between the transmitting and receiving faces of the transducer and the column of couplant which impacts on the ends of the test piece. The test piece may also be inspected in a manner whereby only one end is so tested or the test piece is tested through beam angle techniques. Further, a plurality of test pieces may be tested in a manner accepting or rejecting the tested pieces.

6 Claims, 6 Drawing Figures

ULTRASONIC TESTING SYSTEM FOR A TEST PIECE

BACKGROUND

Ultrasonic waves are used for the non-destructive testing of a test piece or the like to determine the presence of flaws therein. Ultrasonic waves are particularly useful in flaw detection because they can be easily aimed in one direction and can penetrate several feet of metal. Flaw detection using ultrasonics is possible because sound waves are reflected from a crack or other abrupt change in the elastic properties of the material in which the waves are traveling. Hence, either an echo will be detected when a crack interrupts a beam or the ultrasonic intensity on the far side of the crack is much less or even zero.

One of the most important types of ultrasonic inspection involves immersion testing where the test piece is normally completely submerged in a tank of fluid, such as water, and a search unit is spaced from the test piece and acoustically coupled thereto by the fluid. Thus the sound waves may leave a transducer, travel through the water and into the test piece. Echos are returned by the surface, the flaw and the far side of the specimen. The advantages of this type of testing are that the surface does not have to be as smooth as in the contact type of test, flaws near the surface can be more easily detected, the speed of testing is greater, higher test frequencies can be used, and tests on more complex shapes are possible.

However, immersion of a test piece in a liquid is not always possible. Further, it may be undesirable to fully wet a test piece by immersion in a couplant tank. Of course, extra immersion type hardware and handling equipment is required. Finally, servicing and setting up of such equipment and subsequent immersion testing of the test piece is more difficult and less convenient than in non-immersion testing.

SUMMARY

The present invention provides means of using ultrasonic inspection to test a test piece without full immersion thereof while retaining the advantages of immersion testing. More particularly, the present embodiment of the invention includes the mounting of the piece to be tested in a manner exposing both ends thereof. Nozzles are arranged at each end of the test piece and jets of water or other liquid couplant are directed from the nozzles toward the test piece ends. Ultrasonic transducers are mounted within cavities provided in the nozzles and thus a solid body of couplant is created between the transmitting and receiving faces of the transducer and the column of couplant which impacts on the ends of the test piece. The test piece may also be inspected in a manner whereby only one end is so tested or the test piece is tested through beam angle techniques. Further a plurality of test pieces may be tested in a manner whereby the tested pieces may be accepted if no flaws or the like are detected and rejected if flaws or the like are detected.

DRAWING

DESCRIPTION

Figure 1:
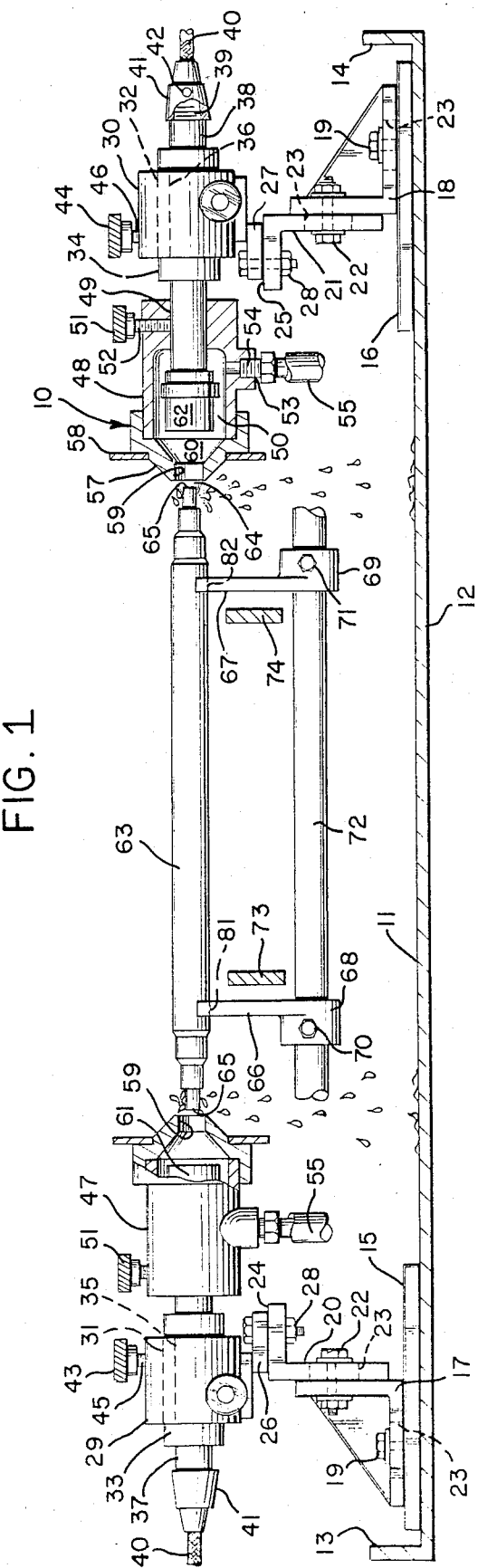
FIG. 1 is a vertical view, partly in cross-section, of a nondestructive testing system using ultrasonic waves in accordance with the present invention.

Referring now to the drawing, and more particularly to FIG. 1, there is shown an ultrasonic nondestructive testing system 10 in accordance with the present invention. The non-destructive testing system 10, shown in FIG. 1, includes a couplant catch pan 11 having a base portion 12 and upstanding integral sides 13 and 14.

A pair of spaced base members 15, 16 are disposed at opposite ends and on the upper surface of pan 11 and include upstanding generally L-shaped flange members 17 and 18, respectively bolted thereto by bolts 19 or the like. A like pair of generally L-shaped flange members 20, 31 may be secured, via nuts-and-bolts 22, to flange members 17, 18, respectively, as shown. All of the flange members 17, 18, 20 and 21 may be provided with suitable slots 23 so that the members are both vertically and longitudinally adjustable.

With the foregoing arrangement, flange members 20, 21 present a pair of generally horizontal flat surfaces 24 and 25, respectively. A pair of flanges 26 and 27 are bolted, via bolts 28, on the surfaces 24, 25, respectively. A pair of manipulator housings 29 and 30 are welded or the like to each flanges 26, 27, respectively. Each housing 29, 30 may be generally cylindrical with coaxially disposed bores 31, 32 extending therethrough. Generally cylindrical sleeve members 33, 34 are axially disposed in bores 31, 32 for rotational movement therein. These sleeve members 33, 34 also may have coaxially disposed bores 35, 36 extending therethrough for receiving a pair of elongated rod members 37, 38, respectively, for sliding movement therein. Rod members 37, 38 are coaxially aligned with one another and may terminate in threaded ends 39, for receiving thereon a member 41 which is connected to suitable electrical conduits 40 for reasons to be discussed shortly. Lock pins 42 may be used to securely hold member 41 to each rod member 37, 38.

A plurality of knurled knobs 43, 44 having threaded portions 45, 46, respectively, threaded into suitable apertures in housings 29, 30 and into abutting engagement with sleeve members 33, 34, may be provided on each housing 30, 31, for locking sleeve members 33, 34 in position with respect to housings 30, 31.

Each rod member 37, 38 extends through a respective couplant housing 47, 48 having a throughbore 49 for receiving the rod member therein. Each throughbore 49 communicates with an enlarged cavity 50 formed within each housing 47, 48. A knurled knob 51 having a threaded portion 52 threaded in a suitable aperture in each housing 47, 48 and into abutting engagement with rod member 37, 38 may be provided on each housing 47, 48 for locking the housings in position on their respective rod members.

A couplant inlet 53 may be provided in fluid communication with each cavity 50. These inlets are internally threaded for receiving therein the threaded end 54 of a couplant hose 55 which is in fluid communication with a remote source (not shown) of a suitable couplant.

The forward or inner end of each housing 47, 48 receives thereon a generally conically-shaped nozzle 57 having an annular splash guard 58 encircling the base of the tapered portion of nozzle 57 as shown. Nozzle 57 thus forms a restricted orifice 59 which is coaxially aligned with the longitudinal axes of each rod member 37, 38.

It can also be seen that the interior of nozzle 57 is in the form of a conically-shaped chamber 60 which is in fluid communication with both orifice 59 and cavity 50.

A pair of conventional transducers 61, 62 are mounted in each cavity 50. These transducers 61, 62 may be secured to the free end of rod members 37, 38 in any suitable manner and are also coaxially aligned therewith and in electrical engagement with conduits 40.

In accordance with the exemplary embodiment of my invention, an elongated test piece 63 is shown coaxially mounted in system 10 with respect to the longitudinal axes of rod members 37, 38 (and thus, of course, with respect to the axes of orifices 59). The test piece 63 is mounted in such a way that a space 64 is formed between the free ends 15 of the test piece 63 and the mouth of orifice 59. Also, it can be seen that orifice 59 may be generally circular in cross-section with a diameter generally related to the outer diameter of the ends 65 of test piece 63 (which may also be generally circular in cross-section).

Any suitable means may be provided for so mounting test piece 63. For example, a pair of spaced brackets 66, 67 may be provided having integral sleeve portions 68, 69 bolted, via bolts 70, 71 to a cross-bar 72. Brackets 66, 67 may have test piece 63 resting thereon in suitable grooves 81, 82 therein with the inherent weight thereof retaining it in fixed position. Also, the particular length of cross-bar 72 may be related to the length of test piece 63. Cross-bar 72 may be secured to or otherwise rest on pan 11 in any suitable manner (not shown). Finally, a pair of elongated and adjustable transfer bars 73, 74 (shown only in cross-section) may extend between brackets 66, 67 above cross-bar 72 and below test piece 63 for moving test piece 63 laterally by selective engagement of bars 73, 74 with test piece 63 as will be discussed shortly. Bars 73, 74 may be connected to suitable support members (not shown) associated with system 10.

In operation, rod members 37, 38 are disposed within sleeve members 33, 34 in housings 29, 30 and locked in position via knobs 43, 44. The couplant housings 47, 48 are also laterally adjusted on rod members 37, 38 via knobs 51. The couplant hoses 55 are threadedly connected to inlets 53. The transducers 61, 62 are mounted in each housing 47, 48 as shown and electrical current is provided between conduits 40 and transducers 61, 62. The test piece 63 is mounted, via brackets 66, 67, so that it is coaxially aligned with rod members 37, 38 and orifices 59.

In operation, a suitable liquid couplant, such as water or the like, is flowed through hoses 55 and enters cavities 50 where it is discharged in a stream or jet of couplant out of restricted orifice 59. The stream or jet of couplant impacts against the forward faces 75 of the test piece ends 65. The ultrasonic transducers 61, 62 are mounted within cavities 50 and thus immersed in the liquid couplant. In this manner, a solid body of couplant is creating within the transmitting and receiving faces of the transducer and the column of liquid couplant which impacts on the faces 75 of the test piece ends 65.

Any suitable sending and receiving transducers 61 and 62 may be used to carry out the techniques of my invention. For example, conventional piezoelectric crystals may be used. Also, it is to be understood that transducers 61 and 62 may be coupled via conduits 40 to suitable electronic circuits for producing the transmitted signal, amplifying the received signal, and synchronizing the display system. Means may be provided for displaying the received signal.

Figure 2:
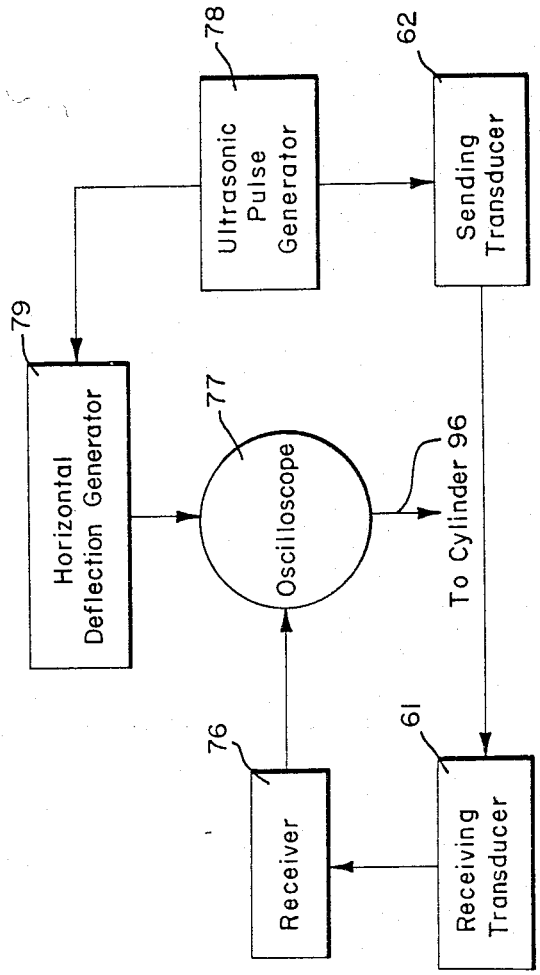
FIG. 2 is a schematic illustration of a circuit in accordance with the system of FIG. 1.

The foregoing is schematically illustrated in FIG. 2 wherein sending or transmitting transducer 62 is shown which produces a series of intermittently occurring high voltage, high frequency pulses. Pulses from transducer 62 are received at receiving transducer 61. Receiving transducer 61 is coupled to a receiver 76 which in turn is coupled to an oscilloscope 77. The transmitting transducer 62 is driven by a pulse generator 78, which also drives a horizontal deflection generator 79. The horizontal deflection generator 79 and the receiver 76 drive the oscilloscope 77. The results of the output of receiving transducer 61 and the horizontal deflection generator 79 are displayed on the face of oscilloscope 77. The screen or face of the oscilloscope 77 reflects the return energy in the form of spikes of the initial pulse. Thus, spikes may be shown indicative of defects and back reflections from the test piece 63. Any random spike which appears between the initial spacing is indicative of flaws, defects or other discontinuities in the test piece 63. Thus, the location of these flaws is identifiable by the random spikes between the initial return spikes as well known in the transducer art.

It can be seen, therefore, that the beams of ultrasonic energy from transducer 62 are directed via the liquid couplant against the face 75 of the test piece end 65. The liquid couplant provides acoustical coupling between transducer 62 and test piece 63.

Thus, test piece 63 can be tested for flaws or defects or the like without full immersion thereof. The nozzles 57 are adjustable for varying the flow of the couplant, the pressure thereof, the beam path of the transducers 61, 62, distance between the transducers 61, 62 and optimum beam alignment. The transducers 61, 62 can be easily adjusted and serviced and a minimum amount of couplant is required. There is also a uniform laminar flow of couplant.

Figure 3:
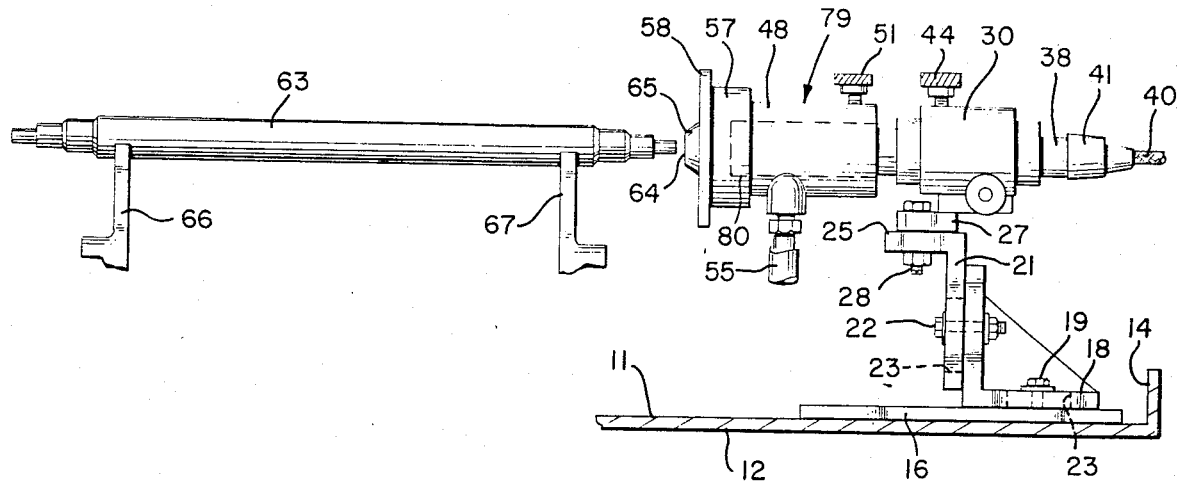
FIG. 3 is a vertical view of a portion of a modified nondestructive testing system in accordance with the techniques of the present invention.

Referring now to FIG. 3, the techniques discussed hereinabove may be used to carry out pulse-echo testing of test piece 63. Thus, in system 79 illustrated in FIG. 3, wherein like numerals refer to like parts of FIG. 1, test piece 63 is aligned in a manner to receive couplant flow from nozzle 57. However, in this embodiment, only one nozzle 57 is provided and the sending and receiving transducers of FIG. 1 are replaced by a single combination transmitting-receiving transducer 80 (shown in dotted lines in position within housing 47).

Figure 4:
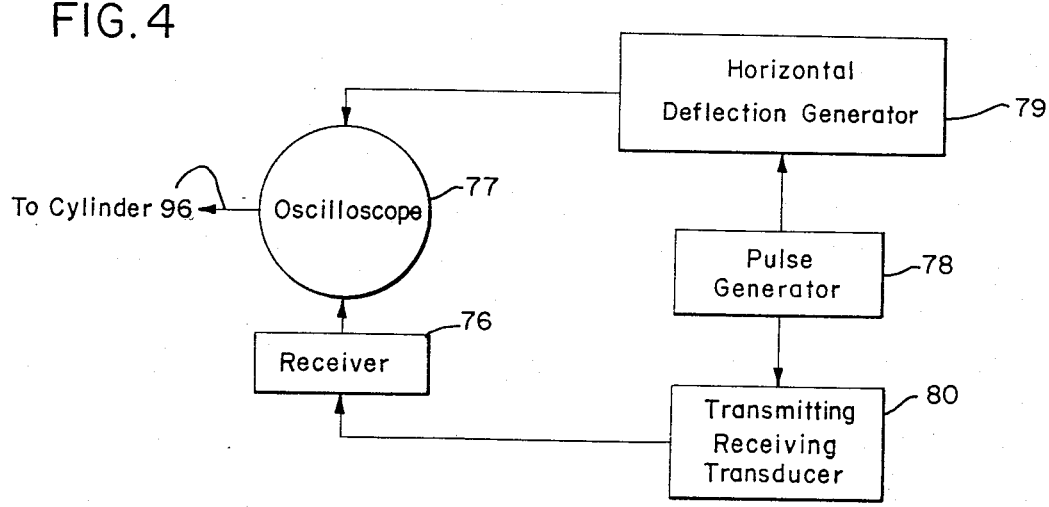
FIG. 4 is a schematic illustration of a circuit in accordance with the system of FIG. 3.

FIG. 4 shows an exemplary circuit for displaying signals from transducer 80. This circuit is similar to the circuit of FIG. 2 except for the combining of transducers 61, 62 in a single transducer 80. Thus, further comment is deemed unnecessary.

Figure 5:
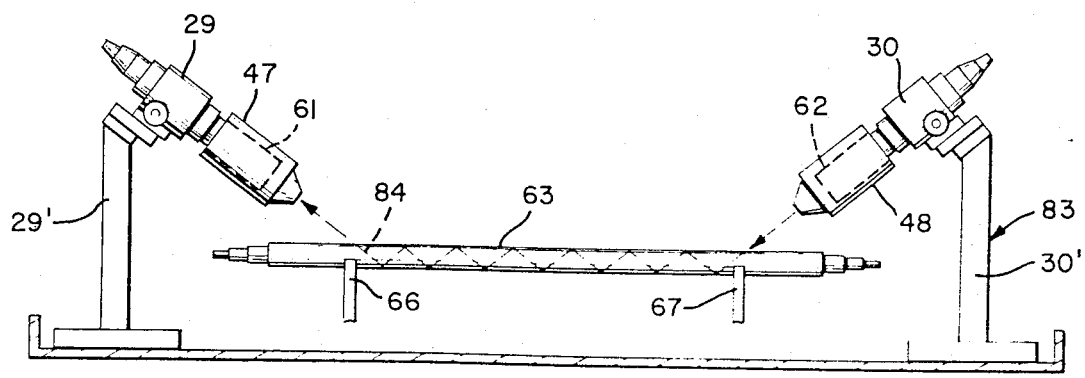
FIG. 5 is a vertical view of a portion of a modified nondestructive testing system in accordance with the techniques of the present invention.

FIG. 5 illustrates a beam-angle testing system 83 of a test piece 63. In this embodiment, where again like numerals refer to like parts of FIG. 1, the housings 29, 30 are mounted on stands 29', 30' with transmitting transducer 62 in housing 30 being mounted in a manner directing its beam through test piece 63 as indicated by arrow 84 with the signal therefrom received by receiving transducer 61 within housing 29. In both the FIG. 3 and this embodiment, portions of systems 79 and 83 for providing the liquid couplant have been omitted for convenience of illustration. Further, the circuit of FIG. 2 is also applicable to the system 83 of FIG. 5.

Figure 6:
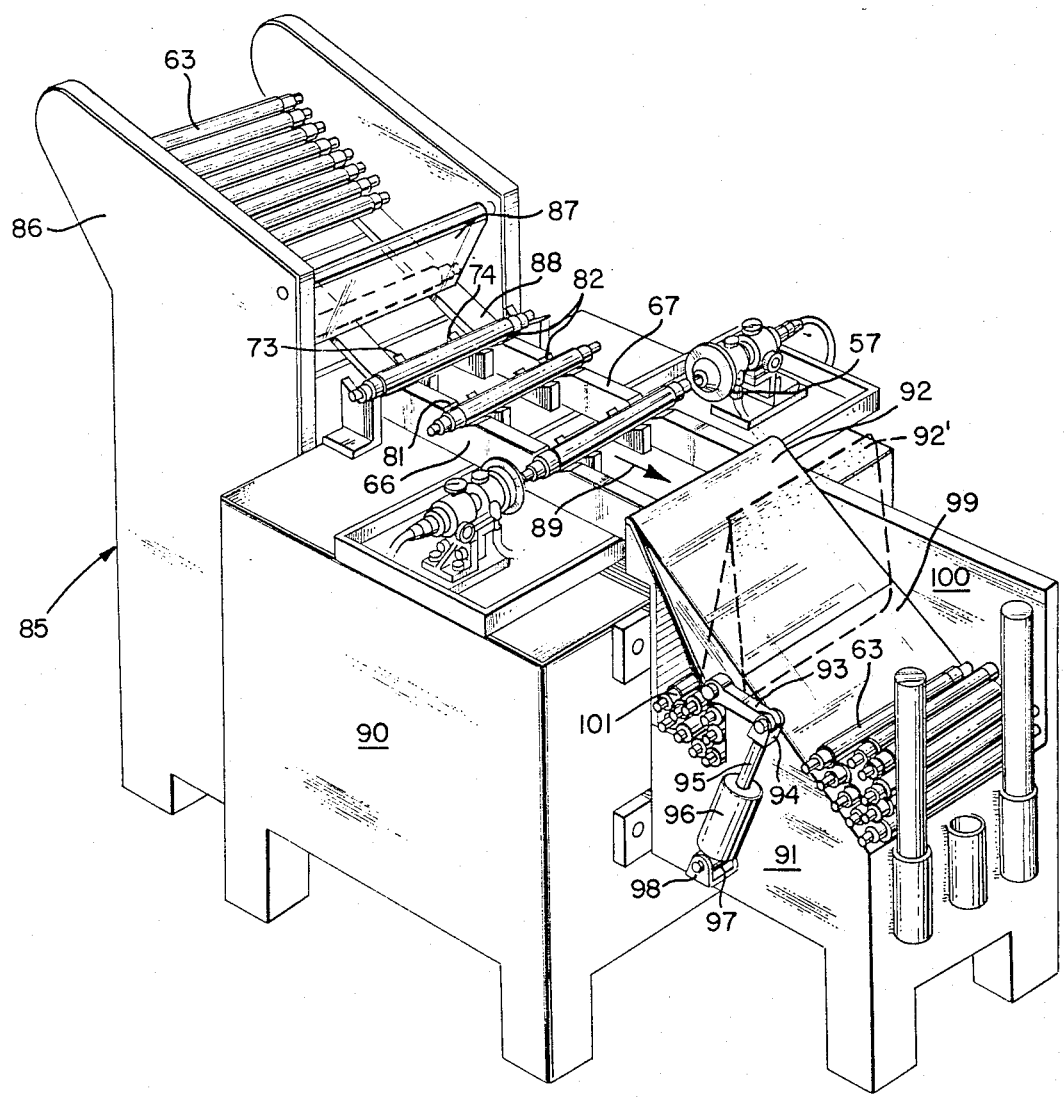
FIG. 6 is a perspective view of a system for carrying out nondestructive testing of a plurality of test pieces in accordance with the teachings of the present invention.

Referring now to FIG. 6 where again like numerals refer to like parts of FIG. 1, a system 85 is illustrated for testing a plurality of test pieces 63. System 85 is applicable to the testing of pieces in the manner described with respect to FIGS. 1, 3 and 5. Thus, a feed hopper 86 is provided having a plurality of test pieces 63 retained therein by a gate 87. Gate 87 is adapted to open in a manner releasing test pieces 63 one-at-a-time. Any suitable means may be provided for actuating gate 87 in an automated manner.

The released pieces 63 roll down ramp 88 and onto the brackets 66, 67. These pieces are retained in the grooves 81, 82 in brackets 66, 67. The transfer bars 73, 74 are adapted to be moved upwardly in a generally arcuate manner to kick or move the test pieces from one groove 81, 82 to another in the direction of arrows 89. A couplant reservoir and pumping system 90 is associated with system 85 and operably connected to nozzles 57 for supplying a source of suitable couplant under pressure.

A test piece receiving section 91 is also associated with system 85. This section 91 includes a movable reject gate or ramp 92 (in solid and dotted lines) which is adapted to be selectively moved from its solid line position (where it receives test pieces 63 from brackets 66, 67) to its dotted line position 92' out of engagement with brackets 66, 67 (thus rejecting test pieces 63).

Ramp 92 is thus operatively connected to a flange member 93 which is in term operatively connected to a bracket 94 carried at the end of a piston rod 95 of a cylinder 96, such as a hydraulic cylinder. Cylinder 96 may be pivotally connected, via flange 97, to a mounting bracket 98 carried by receiving section 91.

It is to be understood that cylinder 96 is adapted to be activated through the circuits of FIGS. 2 and 4 to either accept or reject test pieces 63. This is shown schematically in FIGS. 2 and 4. Thus, in the solid line position of ramp 92 in FIG. 6, cylinder 96 so disposes ramp 92 as to receive test pieces 63 from ramp 92 to a ramp 99 associated with a test piece acception section 100 of receiving section 91. In like manner, if an undesirable flaw is detected in the test piece 63, cylinder 96 is activated to move ramp 92 to its dotted line position 92' permitting the rejected test piece to fall by gravity into a rejection bin 101.

It is to be understood that suitable controls, alarms, signals, lights, etc. may be provided for carrying out the foregoing techniques in an automated manner and such means are well known in the testing art. It will be apparent to those having skill in the art that variations and modifications of the systems herein disclosed may be made without departing from the scope of the invention.

I claim:

1. An ultrasonic testing system for nondestructive testing a plurality of test pieces having an elongated body for flaws or the like, said system comprising
at least one nozzle associated with said system having a cavity therein and an orifice in fluid communication with said cavity,
a source of liquid couplant in fluid communication with the interior of said cavity for supplying a liquid couplant under pressure in said nozzle,
transducer means fixed disposed in said cavity and in fluid engagement with said liquid couplant for directing a pulse out of said orifice,
aligning means associated with said system for aligning said test piece in a manner receiving both said pulse and said liquid couplant thereagainst, and
transporting means associated with said system for selectively transporting each of said test pieces into alignment with said aligning means.

2. The system of claim 1 wherein said transporting means includes a feed hopper containing therein a plurality of test pieces, an inclined ramp associated with said feed hopper and adapted to release said test pieces therefrom down said ramp one-at-a-time.

3. The system of claim 2 wherein said transporting means further includes a pair of spaced brackets having notches on the upper surface thereof for receiving one of said test pieces from said ramp in each of said notches, and said aligning means includes a notch on each of said brackets aligned with respect to said nozzle.

4. The system of claim 3 wherein said transporting means further includes test piece transfer means adapted to operatively engage test pieces disposed in said notches for selectively moving said test pieces from one of said notches to another in a direction away from said hopper.

5. The system of claim 4 wherein said transporting means further includes test piece receiving means associated with said brackets for receiving test pieces therein after engagement with said transducer means.

6. The system of claim 5 wherein said receiving means further includes a test piece acceptance area and a test piece rejection area, and means associated with both said transducer means and said receiving means for selectively admitted test pieces tested by said transducer means into either said rejection area or said acceptance area.

* * * * *